United States Patent
Dover et al.

[11] Patent Number: 5,927,969
[45] Date of Patent: Jul. 27, 1999

[54] BATCH SYSTEM CROSS-FLOW ROTARY CALCINER

[75] Inventors: Bruce J. Dover, Lockport; Edward V. McCormick, Churchville, both of N.Y.

[73] Assignee: Harper International Corp., Lancaster, N.Y.

[21] Appl. No.: 09/071,393

[22] Filed: May 1, 1998

[51] Int. Cl.[6] .................................................. F27B 7/20
[52] U.S. Cl. ............................................................. 432/103
[58] Field of Search .................................... 432/103, 105, 432/107, 108, 111

[56] References Cited

U.S. PATENT DOCUMENTS

| | | | |
|---|---|---|---|
| 4,136,965 | 1/1979 | Sunnergren et al. | 432/118 |
| 4,345,896 | 8/1982 | Abernathy, Jr. et al. | 432/103 |
| 4,535,550 | 8/1985 | Walter | 34/138 |
| 4,961,390 | 10/1990 | Whitlow et al. | 432/103 |
| 5,297,494 | 3/1994 | Kim et al. | 432/103 |

*Primary Examiner*—Teresa Walberg
*Assistant Examiner*—Gregory A. Wilson
*Attorney, Agent, or Firm*—James J. Ralabate

[57] ABSTRACT

This invention relates to a batch type rotary calcination system where the gas used to heat and chemically react a particulate material is cross-flow contacted with the particulate material. This cross-flow is achieved by locating a gas inlet and a gas outlet adjacent an apertured cylinder containing the particulate material. The apertures on the cylinder are covered by a screen designed to permit gas flow through but prevent the escape of particulate material from the system. The gas inlet and gas outlet are so positioned to provide a continuous gas cross-flow through the particulate material being treated.

17 Claims, 3 Drawing Sheets

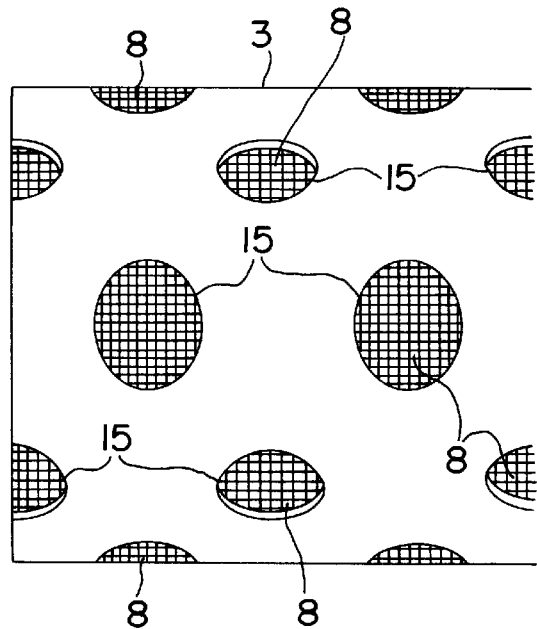
F I G. 5
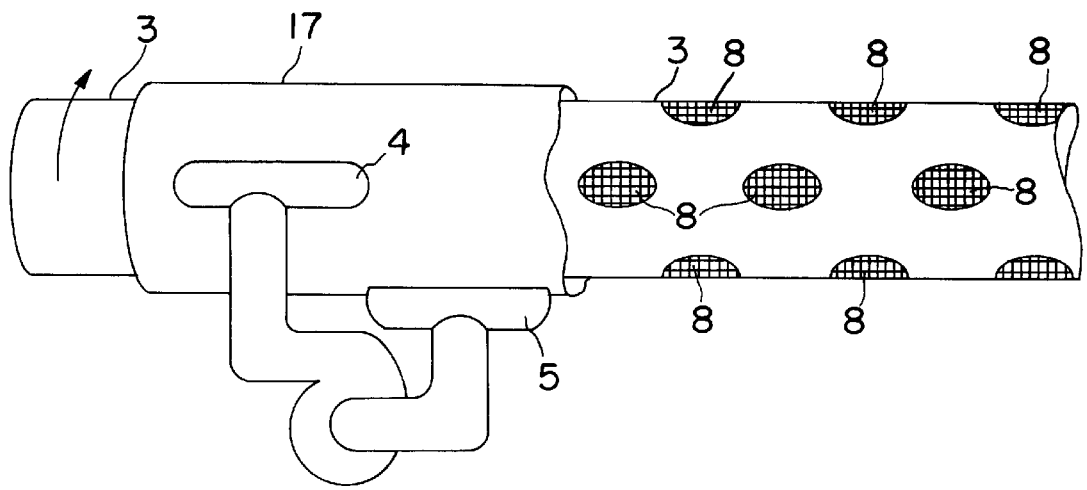
F I G. 6

BATCH SYSTEM CROSS-FLOW ROTARY CALCINER

This invention relates to a batch-scale calciner and, more specifically, to a batch system using a cross-flow rotary calciner.

BACKGROUND OF THE INVENTION

In calcination systems, materials are heated to high temperatures without fusing the materials but rather to effect useful chemical changes such as oxidation or reduction. Calcination is also used to expel the volatile portions of a substance by heat. Various heating processes or systems are known to affect calcination of materials. Thermal processing of a material generally requires gas-solid contact to dry the material and sometimes to free the material of all residual acids at temperatures below the melting point of the material. This is accomplished by the use of drying equipment such as commercial dryers or calcination kiln systems. Some of the prior art dryers used are gravity dryers, roto-louvre dryers, heat vibrating conveyor dryers, rotary kilns, direct and indirect heat rotary systems and stem tube dryers.

This invention is concerned with and intended primarily for both calcination systems which both dry a material and cause a chemical reaction or chemical change in the material being processed. However, if a particulate material is to be only dried, this present system can be used. By "batch" as used throughout this disclosure is meant a system, process or apparatus used for or in batch as opposed to a continuous process. There are known two types of direct-heat rotary calcinating equipment, those using longitudinal cocurrent gas-solid flow and those using longitudinal countercurrent flow of gas and solids. Usually, somewhat greater heat-transfer efficiency is obtained by using countercurrent flow; cocurrent flow can be used to process heat-sensitive materials at higher inlet gas temperatures. In both of these rotary calcination systems, better heat-transfer efficiency and better material yield are somewhat difficult to achieve with prior art equipment. An additional concern using both cocurrent flow and countercurrent flow is the possibility of substantial attrition of the material being processed. Several prior art calcination systems are disclosed in *Perry's Chemical Engineers' Handbook*, pages 20–30 to 20–75, Sixth Edition, McGraw-Hill Book Company.

Thus, calcination is distinguished from dryers in that calcination not only dries a material by heat but also effects a chemical change in the material such as reducing mineral high oxides to low oxides, calcination of silica gel, removal of sulfur from cobalt, copper and nickel, reduction of metal oxides, oxidizing and burning off of organic impurities, reduce a metal oxide to a metal and other various chemical changes obtainable in calcination systems. The present invention is related to calcination systems and not only pure drying systems. Thus, the calcining system of the present invention is designed to operate at elevated temperatures of at least below the melting point of the particulate material treated which is substantially higher than most heat dryers.

As earlier noted, in rotary calcination systems, the heated gas is introduced and passed through the system in either cocurrent or countercurrent gas flow fashion. The present invention uses batch rotary calcination equipment that provides gas cross-flow through the material being treated. The energy utilization is optimized in the present process as compared with the prior art processes and hold-up of material is substantially eliminated.

Some of the related prior art processes are disclosed in U.S. Pat. Nos. 1,185,899; 3,645,010; 4,535,550; 5,083,870; 5,052,809 and 5,312,599.

In U.S. Pat. No. 1,185,899 (Geiger), a hot air dryer is disclosed wherein heated air is provided through pipes that rotate inside the rotating drum. Air is introduced into Geiger's system, it then travels longitudinally through tubes 16, through the cylinders 13 and 17 and ultimately out through air outlet 34. In order to produce sufficient draft through the dryer and to ensure that the draft will be properly directed, a fan or blower 32 is employed. In operation, the cylinders 13 and 17 are rotated and the material to be dried is fed into the cylinder 17 through the hopper 25 from which it advances into the cylinder 13 by the continued rotation of the cylinders. The blower used by Geiger is disposed at either end of the dryer as shown in his drawing. When the blower is positioned at the discharge end of the dryer, it is necessary to provide a discharge stack 45 at the other end of the dryer.

Korekawa U.S. Pat. No. 3,645,010 discloses a clothes dryer in which wet clothes introduced into a rotating drum are stirred and dried. The heated air is introduced into Korekawa's dryer via small holes 13 and small holes 25 provided on protruded portions 21. The warm air introduced into the drum 10 is discharged out of the exhaust port 8 through the duct 9 by way of a filter 16. The rotating drum of Korekawa is provided with a projection on the inner surface of the drum for stirring the clothes put therein. Korekawa's structure is quite different from a calciner where much more elevated temperatures are used.

The Walter U.S. Pat. No. 4,535,550 discloses a drying apparatus 12 that includes a gas a gas supply pipe 34 that extends axially through annular plates which are used to retain the tumbling bed 38 of solid particles being dried. A number of radially extending pipes 40 pass from the supply pipe 34 and supply the processing gas to conduits 42 for distribution within the tumbling bed 38 of the material being treated. In drying particulate material by the evaporation of water, the drying gas can be held at temperatures of up to 800° C. At least one air conduit 42 which is in communication with supply pipe 34 extends longitudinally within the vessel 12.

In Sindelar U.S. Pat. No. 5,083,870, an apparatus for manufacturing an asphalt paving composition is disclosed. The portable asphalt machine of Sindelar has a rotating drum with heat zones dispersed along the unit. Gas exits this prior art structure via exit ports 115 and is exhausted through scrubber exhaust 163.

The rotary asphalt dryer of Young U.S. Pat. No. 5,052,809 has a drum having an axis of rotation and a mechanism for introducing materials therein. The gases used in Young's device flow from right to left (as shown in FIGS. 1 and 2) under the influence of a blower and as secondary air is drawn into the inner shell through a secondary air supply means.

A rotary furnace for making chemically active carbon is disclosed in U.S. Pat. No. 5,312,599 (Schwartz). In the Schwartz apparatus, reaction gases are introduced into the system by a tube 26 which has a plurality of outlet ports 42. Positioned also within the furnace 20 are gas exhaust tubes 30 which are disposed in parallel spaced relationship to the inlet tubes 26.

SUMMARY OF THE INVENTION AND PREFERRED EMBODIMENTS

It is therefore an object of this invention to provide a batch-type rotary calcination system devoid of the above-noted disadvantages.

Another object of this invention is to provide a more energy efficient batch-type calcination system than heretofore used.

Still a further object of this invention is to provide an uncomplicated efficient calcination system that provides better gas-solid transfer.

Another yet further object of this invention is to provide a calcination system with improved heat transfer.

Yet still a further object of this invention is to provide a calcination system with better material yield product uniformity and less product attrition.

Still another object of this invention is to provide a calcination system where novel equipment is utilized to effectuate cross flow of the heated gas through the material being treated.

Another object of this invention is to provide a rotary type batch calcination system where the heated gas enters and exits the system laterally (radially) and not longitudinally (axially).

These and other objects of this invention are accomplished by a novel direct heat calcination system comprising a rotary cylindrical kiln having a plurality of screened openings or apertures along the length of the material containing cylinder. Heated gas enters and exits the apertured cylinder through these openings thereby providing a cross-flow of heated gases through the material being treated. The gas entrance and exit is through the peripherally located openings and not longitudinally as previously used in prior art systems. This provides a much more energy efficient thermal treatment of particulate material which also substantially improves product uniformity and yield. The apertures in the cylinder can be uniformly or randomly positioned throughout the length of the particulate product containing cylinder and at least one is in registration at times with the heated gas inlet means and gas outlet means. This feature will be clearly illustrated in the drawings. The components of the structure of this invention can be made from any suitable materials. For example, the cylinder can be made from a high temperature alloy (HT cast alloy, for example), the perforated tube can be constructed of a 330 stainless steel alloy, the gas ducts may be made from the 330 alloy or refractory, and any surrounding or supporting structures can be made from any heat insulating material. Screen covered apertures can be positioned in any suitable manner in the cylinder providing they are in the circumferential wall of the cylinder. The screen used over each opening or aperture can be of any suitable composition and size depending upon the particulate material being processed. For example, in one embodiment, the screen is a 300 mesh 316 stainless steel alloy (or better) woven wire screen. In this embodiment, the screen will be backed up by an expanded metal 309 or 330 screen with an average hole size on the order of 10 mm. Obviously, any suitable screen can be used as the particulate material is more specifically identified.

In one embodiment, the screen assembly is inserted into a centrifugally cast, machined, high temperature alloy tube. This is the type of material which would be used in a comparable conventional rotary kiln.

The tube is regularly perforated with relatively large diameter holes (see FIG. 3, note: diameter of perforation not to exceed ¼ the diameter of the tube). The perforations in the rotating tube match inlet and exhaust ports in close-tolerance machined or cast gas manifolds 3. The materials used to construct the gas manifolds range from castable ceramic to cast iron or other high temperature alloys.

This is a brief description of an embodiment of the batch-scale calciner of this invention. The material is loaded into the screen tube. The screen tube is placed into the process tube and a machined flange is clamped in place. The process tube is perforated to match inlet and outlet gas ports in the stationary insulation package. Heat is supplied by an electric gas heater. If the batch-scale kiln is designed to process a slug of material comparable to the pilot-scale, a ~10kW power input will be required as well as approximately 0.35 $m^3$/min of compressed air at a pressure not less than 1 bar. The kiln in this embodiment will include drive and heater.

BRIEF DESCRIPTION OF THE DRAWINGS

FIG. 5 is an expanded side plan view of the apertured cylinder of this invention in one embodiment thereof.

FIG. 6 is a plan view of an embodiment of the apertured cylinder of this invention where the gas inlet and outlet manifolds are part of an enclosing jacket which houses the cylinder.

DETAILED DESCRIPTION OF THE DRAWINGS AND PREFERRED EMBODIMENTS

Figure 1:
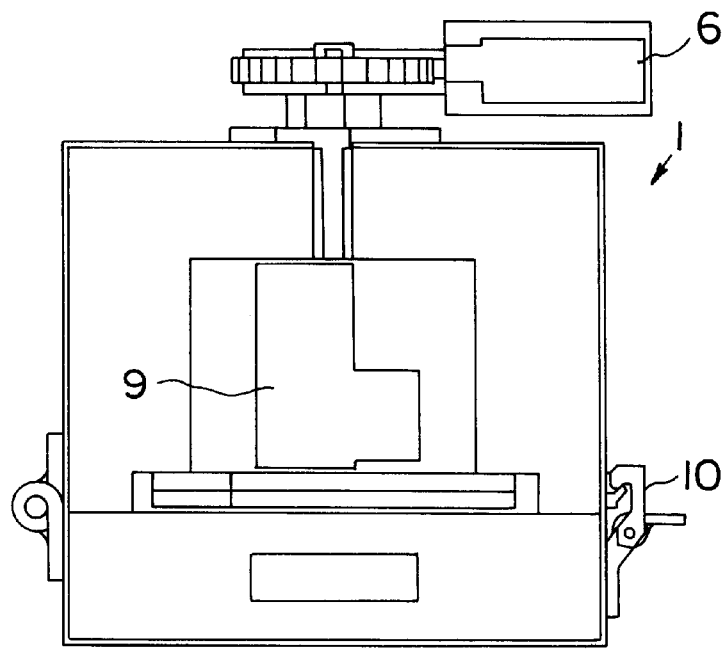
FIG. 1 is a top plan view of an embodiment of a batch type cross-flow rotary calciner of this invention.
Figure 2:
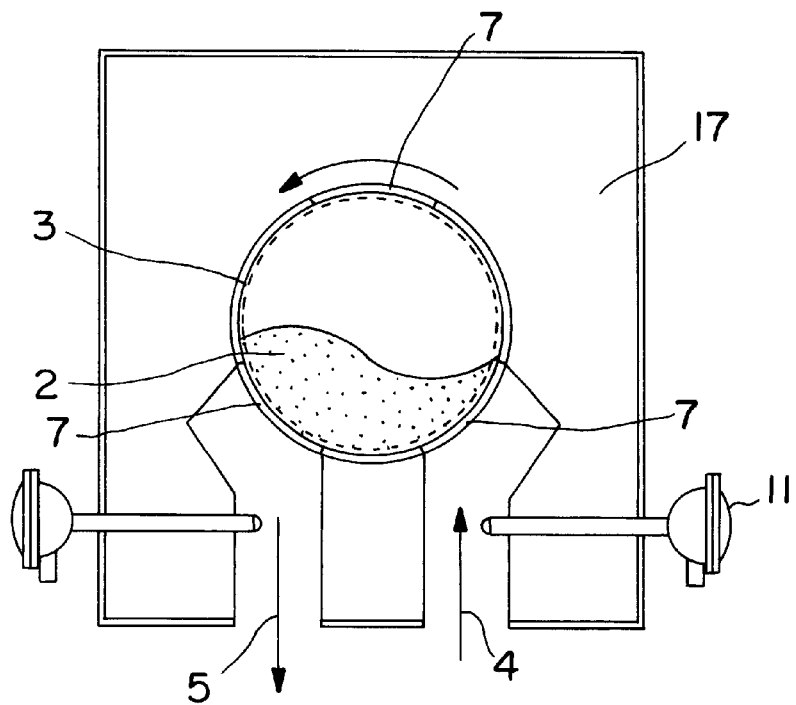
FIG. 2 is a side plan view of the same embodiment of FIG. 1.

In FIGS. 1 and 2, a top and side view of an embodiment of the batch scale cross-flow rotary calciner 1 is illustrated. A particulate material 2 to be processed is loaded into an apertured and screened cylinder 3. The cylinder 3 is placed into the process housing 9 and a machined flange 10 is clamped in place. The apertured cylinder 3 is perforated to match inlet and outlet gas ports 4 And 5 in the stationary insulation package. At least one gas inlet port 4 and at least one outlet gas port 5 is essential for the proper functioning of the present invention. The outlet port 5 is connected to a vacuum means to properly withdraw gases from the cylinder 3. Heat is supplied to the structure by an electric or gas heater 11. The cylinder drive 6 rotates the cylindrical reaction vessel or cylinder 3 as shown in FIG. 2 in a counter-clockwise manner. Hot gas inlet manifold 4 provides heated gas which when aligned enters the screened apertures 7 in the periphery of cylinder 3, then laterally through the particulate material 2 which is housed in cylinder 3, and the gas then exits the cylinder 3 via hot gas exhaust outlet 5. Unlike most prior art dryers or calcination systems, the gas enters and exits the cylinder 3 transversely or laterally and not longitudinally along the length of the tube. The heated gas enters and exits from the peripheral portions of the tube or cylinder 3 thereby allowing the gas to penetrate through the entire material pile 2 rather than longitudinally along the length of the cylinder 3. The screen 8 is fine enough to hold the material 2 being processed in the cylinder 3 but porous enough to permit gas to enter and exit the cylinder 3 through the screened apertures 7. The lateral cross flow of gases through particulate material 2 results in better gas-solid transfer, better heat transfer and a much more energy efficient system. The calcination system of the present invention not only dries the material 2 but also provides the desired chemical reaction intended, i.e. reduction, oxidation, removal of sulfur, burning off organic impurities and others.

Obviously, other cross-flow rotary calciner structures can be used where the heated gas enters the tube 3 laterally and exits laterally (not longitudinally); these are intended to be included within the scope of this invention.

Figure 3:
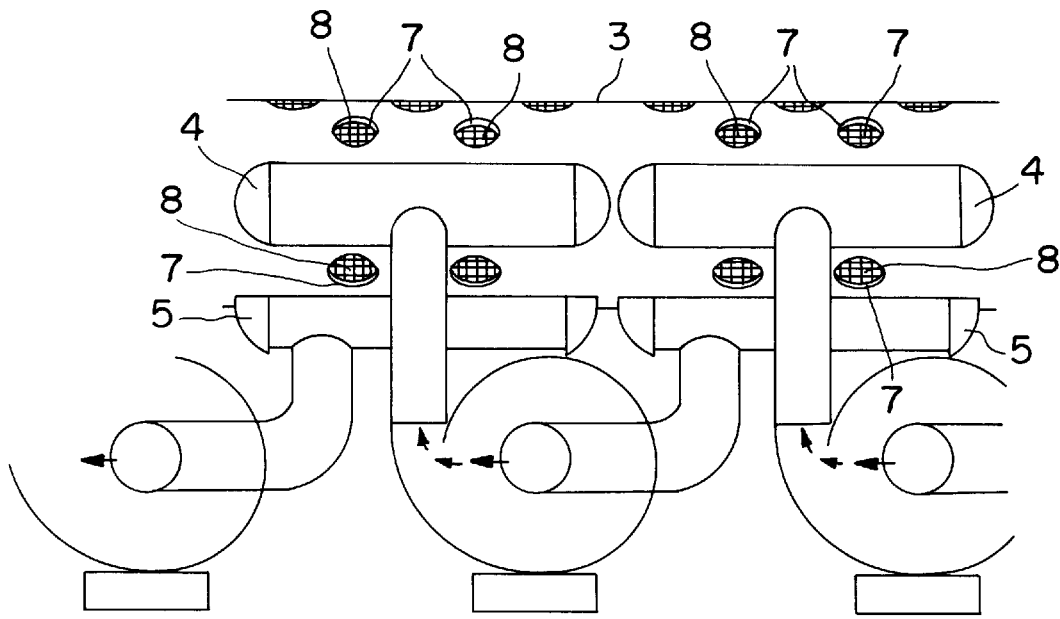
FIG. 3 is an expanded side plan view of the apertured cylinder, gas inlets and gas outlets in one embodiment of this invention.

In FIG. 3 a side view of the apertured cylinder 3, gas inlets 4, and gas outlets 5 in one embodiment of this invention is shown. Illustrated is an apparatus having a plurality of gas inlets 4 and gas outlets 5, but it should be understood that one or more gas inlets 4 and one or more gas outlets 5 may be used. In a preferred embodiment only one gas inlet 4 and only one gas outlet 5 is used for the batch process of this invention. In a larger batch system, the user may want more than one inlet 4 and more than one outlet port 5, if suitable. Also note that the heated gas may be recirculated through the system if desired, as shown by recirculation arrows in FIG. 3. Also the location of inlets 4 and outlets 5 can be reversed from that shown in FIG. 3.

Figure 4:
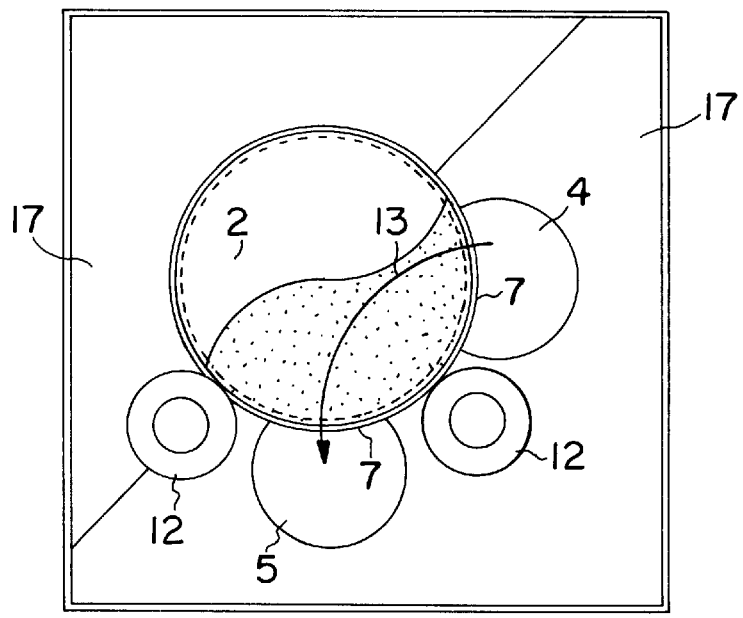
FIG. 4 is a side plan view of a second embodiment of the batch calcinating system of this invention where rollers are used to turn the cylinder containing the material to be processed.

In FIG. 4 a calciner 1 is shown in another variation to that shown in FIGS. 1 and 2. In the embodiment of FIG. 4 a side view of calciner 1 is shown where alloy rollers or other rollers 12 are used to rotate the cylinder 3 containing the particulate material 2 to be processed. The screened apertures 7 are shown in alignment with gas inlet means or port 4 and gas outlet means or port 5. The gas flow or "cross-flow" is shown by the direction arrow 13 where the gas flows into aperture 7 adjacent the gas inlet 4 and goes through the particulate material 2 and out of cylinder 3 via the aperture 7 that is adjacent to and in registration with gas outlet port 5. It is important to the invention that gas outlet port 5 or inlet port 4 be located so that it is below the particulate material 2 when material 2 is contained in the system. The gas flows out from port 5 because of the reduced or negative pressure at the outlet port 5 such as a blower or vacuum means. The vacuum from outlet port 5 will pull the gas from the inlet port 4 through the particulate material 2 and into the outlet port 5. The material is inserted into cylinder 3 by any desired means; however a critical feature of this invention is that the heated gas both enters and exits the calciner laterally via the apertures 7 located in the periphery of cylinder 3. The term "lateral" or "laterally" in this disclosure and in the claims denotes the opposite to longitudinally or transverse to the longitudinal horizontal axis of the cylinder 3. The elevated temperatures used are those used in calcination systems generally higher than those temperatures used in strictly drying systems. The cross-flow rotary calciner of this invention permits easy control of the residence time and minimizes holdup of particulate material 2 since the screened apertures 7 are intermittently back-flushed as an integral part of the process defined herein. Energy utilization is optimized in the present process since heat exchange is achieved by using the air which cools the material 2 as preheated combustion air. The combustion can be run very lean due to the high preheat achieved upon the combustion air by the cooling product. The process heat requirement may be so small in this process that electric heating of the gas could become economically attractive. The energy utilization in the present process is similar to that of an ideal cross-flow heat exchanger. "Gas" as used is intended to include any suitable gas that can be used in the present system such as air, hydrogen, etc.

In FIG. 5, a close up side view of the tube or cylinder 3 of this invention is illustrated. The cylinder 3 has a plurality of either randomly staggered apertures or uniformly positioned apertures 15 (both of which are designated and included as apertures 7 throughout this disclosure for clarity). Either type of apertures 7 may be used depending upon the desired results, type of material, position of gas intake 4 and gas outlet port 5. It is important that in apertures 7, a proper screen 8 be used that is a screen that will retain particulate material 2 in the cylinder 3 without leakage and yet will permit the gas to enter and exit during the calcining operation. The interior face of cylinder 3 can be smooth or have spiral flights, louvers, projections or any other configuration. However, projections are not necessary to this invention and in the preferred embodiment, the interior face of cylinder 3 is substantially smooth.

In FIG. 6, another embodiment of the batch calcination system is illustrated where the material 2 can be fed into the system via terminal tube feed opening 16 and where the gas inlet port 4 and the gas outlet port 5 are integral with an enclosing jacket 17. The inner face of enclosing jacket 17 is tightly abutting the entire or partial outer surface of tube or cylinder 3 so as to minimize any gas leakage or loss. The enclosing jacket 17 can be in the form of a contoured jacket 17 as shown in FIG. 6 or in the form of a block enclosure as shown in FIGS. 2 and 4. The processed particulate product 2 may be removed from tube or cylinder 3 in or by any suitable means. The gas is recycled in the system as shown in FIG. 6.

In a continuous version of the batch process of this invention, product would be continuously fed and removed from the system. The continuous version of this cross-flow rotary calcination system is the subject matter of a separate copending patent application.

The preferred and optimumly preferred embodiments of the present invention have been described herein and shown in the accompanying drawings to illustrate the underlying principles of the invention, but it is to be understood that numerous modifications and ramifications may be made without departing from the spirit and scope of this invention.

What is claimed is:

1. An apparatus for the batch calcination of a particulate material comprising in combination a directly heated rotary cylinder, a heated gas inlet means, a gas outlet means, heating means for supplying heat to said apparatus and means for imparting rotation to said rotary cylinder, said rotary cylinder having apertures therein extending from an interior portion of said cylinder to an exterior portion of said cylinder, said apertures covered substantially completely by a screen, said screen being of a mesh that contains said particulate material within said cylinder and yet permits the passage therethrough of a gas, said gas inlet means and said gas outlet means positioned in said apparatus so as to cause a cross-flow of said gas through said particulate material contained in said cylinder, and wherein said gas inlet means and said gas outlet means are positioned tightly adjacent to an outer surface of said cylinder in a manner so as to be in gas flow registration with at least one of said apertures in said cylinder.

2. The apparatus of claim 1 wherein either said gas outlet means or said gas inlet means is positioned in said apparatus at a location below at least a portion of said particulate material being treated.

3. The apparatus of claim 1 wherein said cylinder has rotation means whereas said gas inlet and gas outlet means are substantially in a fixed position.

4. The apparatus of claim 1 wherein said gas has circulation means whereby it enters and exits said cylinder at a peripheral portion of said cylinder.

5. The apparatus of claim 1 wherein said gas has means whereby it enters and exits said cylinder in a path transversely to the horizontal longitudinal axis of said cylinder.

6. The apparatus of claim 1 wherein said gas has means whereby it is recycled through the apparatus on a continuous basis during a batch process.

7. The apparatus of claim 1 wherein said gas has circulation means whereby said gas contacts said particulate material both when the gas enters and when it exits the cylinder.

8. The apparatus of claim 1 wherein said heating means has means to supply heat to said apparatus of a temperature of below the melting point of said particulate material.

9. A batch process for the calcination and thermal treatment of a particulate material comprising the steps of loading said particulate material into an apertured cylindrical rotary reaction vessel having apertures along its circumferential wall, tightly closing said reaction vessel or cylinder except for said apertures, directing a continuous gas flow via a gas inlet means into at least one of said apertures in a manner to thereby contact said particulate material in a cross-flow manner while rotating said cylinder, said heated gas or gas flow after said contact with said particulate material directed to an aperture positioned adjacent to a gas outlet means, thereby causing said gas to exit said cylinder to a recycling means which redirects said gas to said gas inlet means for said continuous gas flow to said gas inlet means, directing said gas from said gas inlet means to at least one of said apertures, continuing this said batch process until the desired chemical reaction of said particulate material is completed, and subsequently removing said particulate material from said cylinder.

10. The process of claim 9 wherein either said gas outlet means or said gas inlet means is positioned in said apparatus at a location below at least a portion of said particulate material being treated.

11. The process of claim 9 wherein said gas inlet means and said gas outlet means are positioned tightly adjacent to an outer surface of said cylinder in a manner so as to be in gas flow registration with at least one of said apertures in said cylinder.

12. The process of claim 9 wherein said cylinder has rotation means whereas said gas inlet and gas outlet means are substantially in a fixed position.

13. The process of claim 9 wherein said gas has circulation means whereby it enters and exits said cylinder at a peripheral portion of said cylinder.

14. The process of claim 9 wherein said gas has means whereby it enters and exits said cylinder in a path transversely to the horizontal longitudinal axis of said cylinder.

15. The process of claim 9 wherein said gas has means whereby it is recycled through the apparatus on a continuous basis during a batch process.

16. The process of claim 9 wherein said gas has circulation means whereby said gas contacts said particulate material both when the gas enters and when it exits the cylinder.

17. The process of claim 9 wherein said heating means has means to supply heat to said apparatus of a temperature of below the melting point of said particulate material.

\* \* \* \* \*